(12) United States Patent
Tople et al.

(10) Patent No.: US 8,674,012 B1
(45) Date of Patent: Mar. 18, 2014

(54) POLY(PHENYLENE ETHER) COMPOSITION, ARTICLE, AND METHOD

(71) Applicant: SABIC Innovative Plastics IP B.V., Bergen op Zoom (NL)

(72) Inventors: Nitin Tople, Evansville, IN (US); Christian Lietzau, Delmar, NY (US); Hua Guo, Beijing (CN)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/651,537

(22) Filed: Oct. 15, 2012

Related U.S. Application Data

(60) Provisional application No. 61/697,927, filed on Sep. 7, 2012.

(51) Int. Cl.
  *C08K 3/34* (2006.01)

(52) U.S. Cl.
  USPC .................. 524/445; 524/449; 524/451

(58) Field of Classification Search
  USPC ......................... 524/445, 449, 451
  See application file for complete search history.

(56) References Cited

U.S. PATENT DOCUMENTS

| | | |
|---|---|---|
| 4,808,647 A | 2/1989 | Abolins et al. |
| 5,294,654 A | 3/1994 | Hellstern-Burnell et al. |
| 5,357,022 A | 10/1994 | Banach et al. |
| 5,499,087 A | 3/1996 | Hiraoka et al. |
| 6,165,309 A | 12/2000 | Burnell et al. |
| 6,576,700 B2 | 6/2003 | Patel |
| 7,291,036 B1 | 11/2007 | Daily et al. |
| 7,824,189 B1 | 11/2010 | Lauermann et al. |
| 8,017,697 B2 | 9/2011 | Carrillo et al. |
| 8,062,747 B2 | 11/2011 | Harada et al. |
| 2006/0122310 A1* | 6/2006 | Matthijssen .......... 524/445 |
| 2007/0112132 A1 | 5/2007 | Zhao et al. |
| 2008/0167407 A1 | 7/2008 | Kishore et al. |
| 2008/0246186 A1 | 10/2008 | Fisher et al. |
| 2010/0130670 A1 | 5/2010 | Gelles et al. |
| 2010/0139944 A1 | 6/2010 | Guo et al. |
| 2010/0168293 A1 | 7/2010 | Sawant et al. |
| 2010/0218797 A1 | 9/2010 | Coyle, Jr. et al. |
| 2010/0294903 A1 | 11/2010 | Shmukler et al. |
| 2011/0152420 A1 | 6/2011 | Elkovitch et al. |
| 2011/0152431 A1 | 6/2011 | Elkovitch et al. |
| 2011/0152471 A1 | 6/2011 | Kamalakaran et al. |

OTHER PUBLICATIONS

U.S. Appl. No. 13/169,137, filed Jun. 27, 2011.
U.S. Appl. No. 13/189,651, filed Jul. 25, 2011.
Non-Final Office Action for U.S. Appl. No. 13/189,651, filed Jul. 25, 2011, Date of Notification Mar. 18, 2013, 53 pages.
U.S. Appl. No. 13/781,792, filed Mar. 1, 2013.
International Search Report and Written Opinion; International Application No. PCT/US2012/044897; International Filing Date Jun. 29, 2012; Date of Mailing Jan. 23, 2013; 8 pages.
International Search Report; International Application No. PCT/US2012/069338; International Filing Date Dec. 13, 2012; 4 pages.

\* cited by examiner

*Primary Examiner* — Peter Szekely
(74) *Attorney, Agent, or Firm* — Cantor Colburn LLP

(57) ABSTRACT

A composition includes specific amounts of a poly(phenylene ether)-polysiloxane block copolymer reaction product and an impact modifier. The poly(phenylene ether)-polysiloxane block copolymer reaction product includes a poly(phenylene ether) and a poly(phenylene ether)-polysiloxane block copolymer. The composition exhibits a desirable balance of impact strength, heat resistance, and flame retardancy while minimizing or excluding flame retardant additives such as organophosphate esters and halogenated flame retardants.

12 Claims, No Drawings

POLY(PHENYLENE ETHER) COMPOSITION, ARTICLE, AND METHOD

CROSS REFERENCE TO RELATED APPLICATION

This application claims the benefit of U.S. Provisional Application Ser. No. 61/697,927 filed Sep. 7, 2012, which is hereby incorporated by reference in its entirety.

BACKGROUND OF THE INVENTION

Poly(phenylene ether) is a type of plastic known for its excellent water resistance, dimensional stability, and inherent flame retardancy. Properties such as strength, stiffness, chemical resistance and heat resistance can be tailored by blending it with various other plastics in order to meet the requirements of a wide variety of consumer products, for example, plumbing fixtures, electrical boxes, automotive parts, and insulation for wire and cable.

Some applications for poly(phenylene ether)-based resins require significant flame retardant capability. Examples include applications in the construction, transportation, electronics, and solar power industries. Poly(phenylene ether) is inherently flame retardant, but it is often blended with impact modifiers that reduce the flame retardancy of the resulting composition even as they improve its processing and mechanical properties. So, flame retardant additives are often required for blends of poly(phenylene ether)s with impact modifiers.

When the application requires a flammability rating of V-1 or V-0 in the 20 millimeter Vertical Burning Flame Test of Underwriter's Laboratory Bulletin 94 "Tests for Flammability of Plastic Materials, UL 94", relatively large amounts of flame retardant additives, especially organophosphate esters, can be required. These large amounts of organophosphate esters can unacceptably reduce the heat resistance of the composition. Also, large amounts of organophosphate esters can exacerbate smoke generation by the composition. Halogenated flame retardants are one alternative to organophosphate esters, but health and safety-based regulatory constraints increasingly discourage or forbid their use.

Accordingly, there remains a need for impact-modified poly(phenylene ether) compositions that exhibit a UL 94 V-1 or V-0 flammability rating along with good impact resistance and heat resistance while containing little or no organophosphate ester or halogenated flame retardant.

BRIEF SUMMARY OF EMBODIMENTS OF THE INVENTION

One embodiment is a composition comprising: 60 to 95 weight percent of a poly(phenylene ether)-polysiloxane block copolymer reaction product comprising a poly(phenylene ether) and a poly(phenylene ether)-polysiloxane block copolymer; and 5 to 40 weight percent of an impact modifier; wherein the impact modifier comprises poly(alkenyl aromatic) content and rubber content, and wherein the weight ratio of poly(alkenyl aromatic) content to rubber content is at least 0.5; wherein the composition comprises 1 to 10 weight percent of polysiloxane covalently bound in the poly(phenylene ether)-polysiloxane block copolymer; wherein the composition comprises less than or equal to 10 parts by weight of polysiloxane not covalently bound in the poly(phenylene ether)-polysiloxane block copolymer relative to 100 parts by weight of polysiloxane covalently bound in the poly(phenylene ether)-polysiloxane block copolymer; wherein the composition comprises less than or equal to 0.5 weight percent of organophosphate esters; wherein the composition comprises less than or equal to 0.5 weight percent of halogens; and wherein all weight percents are based on the total weight of the composition.

Another embodiment is an article comprising any of the compositions described herein.

These and other embodiments are described in detail below.

DETAILED DESCRIPTION OF THE INVENTION

The present inventors have determined that impact-modified poly(phenylene ether) compositions containing a poly(phenylene ether)-polysiloxane block copolymer but little or no organophosphate ester or halogenated flame retardant can exhibit a UL 94 V-1 or V-0 flammability rating at a sample thickness less than or equal to 3.0 millimeters, as well as good impact resistance and heat resistance.

Thus, one embodiment is a composition comprising: 60 to 95 weight percent of a poly(phenylene ether)-polysiloxane block copolymer reaction product comprising a poly(phenylene ether) and a poly(phenylene ether)-polysiloxane block copolymer; and 5 to 40 weight percent of an impact modifier; wherein the impact modifier comprises poly(alkenyl aromatic) content and rubber content, and wherein the weight ratio of poly(alkenyl aromatic) content to rubber content is at least 0.5; wherein the composition comprises 1 to 10 weight percent of polysiloxane covalently bound in the poly(phenylene ether)-polysiloxane block copolymer; wherein the composition comprises less than or equal to 10 parts by weight of polysiloxane not covalently bound in the poly(phenylene ether)-polysiloxane block copolymer relative to 100 parts by weight of polysiloxane covalently bound in the poly(phenylene ether)-polysiloxane block copolymer; wherein the composition comprises less than or equal to 0.5 weight percent of organophosphate esters; wherein the composition comprises less than or equal to 0.5 weight percent of halogens; and wherein all weight percents are based on the total weight of the composition, unless a different weight basis is specified.

The composition exhibits a UL 94 V-1 or V-0 flammability rating, along with good impact resistance and heat resistance while containing little or no organophosphate ester or halogenated flame retardant. Specifically, the composition can exhibit a flammability rating of V-1 or V-0 at a sample thickness less than or equal to 3.0 millimeters in the 20 millimeter Vertical Burning Flame Test of Underwriter's Laboratory Bulletin 94 "Tests for Flammability of Plastic Materials, UL 94", a heat deflection temperature of at least 128° C. determined according to ASTM D 648-07 using a stress of 1.82 megapascals and a sample thickness of 3.2 millimeters, and a notched Izod impact strength of at least 150 joules/meter determined according to ASTM D 256-10 at 23° C. using a pendulum energy of 2.7 joules and an impact velocity of 3.5 meters per second. In some embodiments, the flammability rating is V-0 at a sample thickness less than or equal to 3.0 millimeters. In some embodiments, the flammability rating is V-0 at a sample thickness of 1.5 millimeters. In some embodiments, the heat deflection temperature is 128 to 170° C., specifically 130 to 170° C., more specifically 140 to 165° C., even more specifically 150 to 165° C. In some embodiments, the notched Izod impact strength is 150 to 500 joules/meter, specifically 200 to 400 joules/meter, more specifically 250 to 350 joules/meter.

The composition comprises a poly(phenylene ether)-polysiloxane block copolymer reaction product which in turn comprises a poly(phenylene ether)-polysiloxane block copolymer and a poly(phenylene ether) homopolymer. For brevity, the poly(phenylene ether)-polysiloxane block copolymer reaction product is sometimes referred to herein as the "reaction product". The poly(phenylene ether)-polysiloxane block copolymer reaction product is synthesized by oxidative polymerization of a mixture of monohydric phenol and hydroxyaryl-terminated polysiloxane. This oxidative polymerization produces poly(phenylene ether)-polysiloxane block copolymer as the desired product and poly(phenylene ether) homopolymer as a by-product. It is difficult and unnecessary to separate the poly(phenylene ether) homopolymer from the poly(phenylene ether)-polysiloxane block copolymer. The poly(phenylene ether)-polysiloxane block copolymer is therefore incorporated into the present composition as a "poly(phenylene ether)-polysiloxane block copolymer reaction product" that comprises both the poly(phenylene ether) homopolymer and the poly(phenylene ether)-polysiloxane block copolymer.

The poly(phenylene ether)-polysiloxane block copolymer comprises a poly(phenylene ether) block and a polysiloxane block. The poly(phenylene ether) block is a residue of the polymerization of the monohydric phenol. In some embodiments, the poly(phenylene ether) block comprises phenylene ether repeating units having the structure

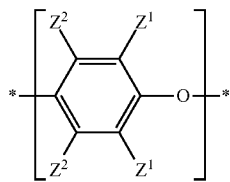

wherein for each repeating unit, each $Z^1$ is independently unsubstituted or substituted $C_1$-$C_{12}$ hydrocarbyl provided that the hydrocarbyl group is not tertiary hydrocarbyl, $C_1$-$C_{12}$ hydrocarbylthio, or $C_1$-$C_{12}$ hydrocarbyloxy; and each $Z^2$ is independently hydrogen, unsubstituted or substituted $C_1$-$C_{12}$ hydrocarbyl provided that the hydrocarbyl group is not tertiary hydrocarbyl, $C_1$-$C_{12}$ hydrocarbylthio, or $C_1$-$C_{12}$ hydrocarbyloxy. In some embodiments, the poly(phenylene ether) block comprises 2,6-dimethyl-1,4-phenylene ether repeating units, that is, repeating units having the structure

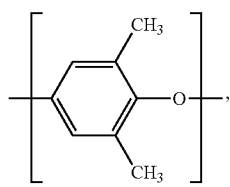

2,3,6-trimethyl-1,4-phenylene ether repeating units, or a combination thereof.

The polysiloxane block is a residue of the hydroxyaryl-terminated polysiloxane. In some embodiments, the polysiloxane block comprises repeating units having the structure

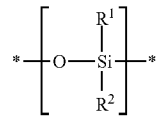

wherein each occurrence of $R^1$ and $R^2$ is independently hydrogen or $C_1$-$C_{12}$ hydrocarbyl; and the polysiloxane block further comprises a terminal unit having the structure

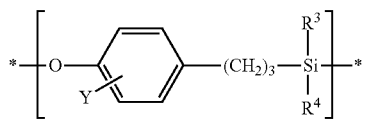

wherein Y is hydrogen, $C_1$-$C_{12}$ hydrocarbyl, or $C_1$-$C_{12}$ hydrocarbyloxy, and wherein each occurrence of $R^3$ and $R^4$ is independently hydrogen or $C_1$-$C_{12}$ hydrocarbyl. In some embodiments, the polysiloxane repeating units comprise dimethylsiloxane ($-Si(CH_3)_2O-$) units. In some embodiments, the polysiloxane block has the structure

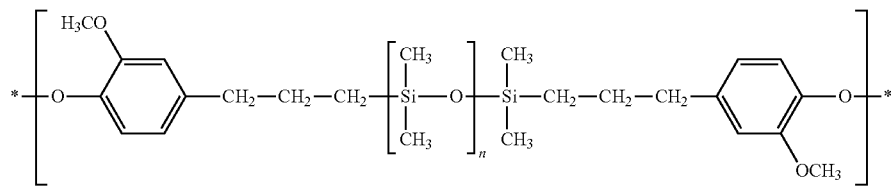

wherein n is, on average, 20 to 60.

The hydroxyaryl-terminated polysiloxane comprises at least one hydroxyaryl terminal group. In some embodiments, the hydroxyaryl-terminated polysiloxane has a single hydroxyaryl terminal group, in which case a poly(phenylene ether)-polysiloxane diblock copolymer is formed. In other embodiments, the hydroxyaryl-terminated polysiloxane has two hydroxyaryl terminal groups, in which case in which case poly(phenylene ether)-polysiloxane diblock copolymer and/or poly(phenylene ether)-polysiloxane-poly(phenylene ether) triblock copolymer are formed. It is also possible for the hydroxyaryl-terminated polysiloxane to have a branched structure that allows three or more hydroxyaryl terminal groups and the formation of corresponding branched block copolymers.

In some embodiments, the hydroxyaryl-terminated polysiloxane comprises, on average, 20 to 80 siloxane repeating units, specifically 25 to 70 siloxane repeating units, more specifically 30 to 60 siloxane repeating units, still more specifically 35 to 50 siloxane repeating units, yet more specifically 40 to 50 siloxane repeating units. The number of siloxane repeating units in the polysiloxane block is essentially unaffected by the copolymerization and isolation conditions, and it is therefore equivalent to the number of siloxane repeating units in the hydroxyaryl-terminated polysiloxane starting material. When not otherwise known, the average number of siloxane repeating units per hydroxyaryl-terminated polysiloxane molecule can be determined by nuclear magnetic resonance (NMR) methods that compare the intensities of signals associated with the siloxane repeating units to those associated with the hydroxyaryl terminal groups. For example, when the hydroxyaryl-terminated polysiloxane is a eugenol-capped polydimethylsiloxane, it is possible to determine the average number of siloxane repeating units by a proton nuclear magnetic resonance ($^1$H NMR) method in which integrals for the protons of the dimethylsiloxane resonance and the protons of the eugenol methoxy group are compared.

In some embodiments, the poly(phenylene ether)-polysiloxane block copolymer reaction product has a weight average molecular weight of at least 30,000 atomic mass units. For example, the reaction product can have a weight average molecular weight of 30,000 to 150,000 atomic mass units, specifically 35,000 to 120,000 atomic mass units, more specifically 40,000 to 90,000 atomic mass units, even more specifically 45,000 to 70,000 atomic mass units. In some embodiments, the poly(phenylene ether)-polysiloxane block copolymer reaction product has a number average molecular weight of 10,000 to 50,000 atomic mass units, specifically 10,000 to 30,000 atomic mass units, more specifically 14,000 to 24,000 atomic mass units.

In some embodiments, the poly(phenylene ether)-polysiloxane block copolymer reaction product has an intrinsic viscosity of at least 0.3 deciliter per gram, as measured by Ubbelohde viscometer at 25° C. in chloroform. In some embodiments, the intrinsic viscosity is 0.3 to 0.5 deciliter per gram, specifically 0.31 to 0.5 deciliter per gram, more specifically 0.35 to 0.47 deciliter per gram.

One indication of the efficiency with which the hydroxyaryl-terminated polysiloxane is incorporated into block copolymer is the low concentration of so-called poly(phenylene ether) "tail" groups in the reaction product. In a homopolymerization of 2,6-dimethylphenol, a large fraction of product molecules have a so-called head-to-tail structure in which the linear product molecule is terminated on one end by a 3,5-dimethyl-4-hydroxyphenyl "head" and on the other end by a 2,6-dimethylphenoxy "tail". Thus, when the monohydric phenol consists of 2,6-dimethylphenol, the poly(phenylene ether) tail group has the structure

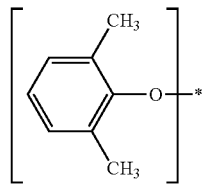

wherein the 3-, 4-, and 5-positions of the ring are substituted with hydrogen atoms (that is, the term "2,6-dimethylphenoxy" refers to a monovalent group and does not encompass divalent 2,6-dimethyl-1,4-phenylene ether groups). In a copolymerization of monohydric phenol with hydroxyaryl-terminated polysiloxane, incorporation of the hydroxyaryl-terminated polysiloxane into block copolymer will reduce the concentration of phenylene ether "tail" groups. Thus, in some embodiments, the monohydric phenol consists of 2,6-dimethylphenol, and the reaction product of comprises less than or equal to 0.4 weight percent, specifically 0.1 to 0.4 weight percent, of 2,6-dimethylphenoxy groups, based on the weight of the reaction product. The 2,6-dimethylphenoxy tail end groups are characteristic of poly(2,6-dimethyl-1,4-phenylene ether) homopolymer with a head-to-tail (hydroxy-monoterminated) structure in which the linear product molecule is terminated on one end by a 3,5-dimethyl-4-hydroxyphenyl "head" and on the other end by a 2,6-dimethylphenoxy "tail". So, the low concentration of 2,6-dimethylphenoxy tail end groups is an indication that the reaction product comprises a reduced concentration of such monofunctional homopolymer and an increased concentration of the desired poly(phenylene ether)-polysiloxane block copolymer.

The poly(phenylene ether)-polysiloxane block copolymer reaction product can further include groups derived from a diphenoquinone, which is itself an oxidation product of the monohydric phenol. For example, when the monohydric phenol is 2,6-dimethylphenol, the diphenoquinone is 3,3',5,5'-tetramethyl-4,4'-diphenoquinone. During the build phase of the copolymerization, the diphenoquinone is typically incorporated into the "tail" end of a head-to-tail poly(phenylene ether) as the corresponding biphenyl group. Through further reactions, the terminal biphenyl group can become an internal biphenyl group in the poly(phenylene ether) chain. In some embodiments, the monohydric phenol consists of 2,6-dimethylphenol, and the reaction product comprises 0.1 to 2.0 weight percent, and specifically 1.1 to 2.0 weight percent, of 2,6-dimethyl-4-(3,5-dimethyl-4-hydroxyphenyl)-phenoxy ("biphenyl") groups. The biphenyl groups are present only in bifunctional (head-to-head or hydroxyl-diterminated) structure. So, the low concentration of biphenyl group is an indication that the reaction product comprises a reduced concentration of such bifunctional homopolymer and an increased concentration of the desired poly(phenylene ether)-polysiloxane block copolymer.

The oxidative copolymerization can be conducted with a reaction time greater than or equal to 110 minutes. The reaction time is the elapsed time between initiation and termination of oxygen flow. (Although, for brevity, the description herein repeatedly refers to "oxygen" or "oxygen flow", it will be understood that any oxygen-containing gas, including air, can be used as the oxygen source.) In some embodiments, the reaction time is 110 to 300 minutes, specifically 140 to 250 minutes, more specifically 170 to 220 minutes.

The oxidative copolymerization can include a "build time", which is the time between completion of monomer addition and termination of oxygen flow. In some embodiments, the reaction time comprises a build time of 80 to 160 minutes. In some embodiments, the reaction temperature during at least part of the build time can be 40 to 60° C., specifically 45 to 55° C.

The poly(phenylene ether)-polysiloxane block copolymer reaction product can be isolated from solution by an isolation procedure that minimizes volatile and nonvolatile contaminants. For example, in some embodiments, the reaction product comprises less than or equal to 1 weight percent of total volatiles, specifically 0.2 to 1 weight percent of total volatiles. In some embodiments, the monomer mixture is oxidatively copolymerized in the presence of a catalyst comprising a metal (such as copper or manganese), and the poly(phenylene ether)-polysiloxane block copolymer reaction product comprises less than or equal to 100 parts per million by weight of the metal, specifically 5 to 100 parts per million by weight of the metal, more specifically 10 to 50 parts per million by weight of the metal, even more specifically 20 to 50 parts by weight of the metal, based on the weight of the poly(phenylene ether)-polysiloxane block copolymer reaction product.

Certain isolation procedures make it possible to assure that the poly(phenylene ether)-polysiloxane block copolymer reaction product is essentially free of residual hydroxyaryl-terminated polysiloxane starting material. In other words, these isolation procedures assure that the polysiloxane content of the reaction product consists essentially of poly(phenylene ether)-polysiloxane block copolymer and poly(phenylene ether) homopolymer. After termination of the copolymerization reaction, the poly(phenylene ether)-polysiloxane block copolymer reaction product can be isolated from solution using methods known in the art for isolating poly(phenylene ether)s from solution. For example, the poly(phenylene ether)-polysiloxane block copolymer reaction product can be isolated by precipitation with an antisolvent comprising at least 50 weight percent of one or more $C_1$-$C_6$ alkanols, such as methanol, ethanol, n-propanol, or isopropanol. The use of an isopropanol-containing antisolvent is advantageous because isopropanol is a good solvent for unreacted hydroxyaryl-terminated polysiloxane. Therefore, precipitation and/or washing with an isopropanol-containing antisolvent (e.g., isopropanol alone) substantially remove hydroxyaryl-terminated polysiloxane from the isolated product.

Thus, in some embodiments the poly(phenylene ether)-polysiloxane block copolymer reaction product comprises less than or equal to 1.5 weight percent of the hydroxyaryl-terminated polysiloxane, specifically less than or equal to 1 weight percent of the hydroxyaryl-terminated polysiloxane, more specifically less than or equal to 0.5 weight percent of the hydroxyaryl-terminated polysiloxane, still more specifically less than or equal to 0.1 weight percent of the hydroxyaryl-terminated polysiloxane, based on the total weight of the poly(phenylene ether)-polysiloxane block copolymer reaction product.

The composition comprises less than or equal to 10 parts by weight of hydroxyaryl-terminated polysiloxane not covalently bound in the poly(phenylene ether)-polysiloxane block copolymer for each 100 parts by weight of hydroxyaryl-terminated polysiloxane covalently bound in the poly(phenylene ether)-polysiloxane block copolymer. Within this limit, the amount of hydroxyaryl-terminated polysiloxane not covalently bound in the poly(phenylene ether)-polysiloxane block copolymer can be less than or equal to 5 parts by weight, specifically less than or equal to 3 parts by weight, more specifically less than or equal to 2 parts by weight, even more specifically less than or equal to 1 part by weight. In some embodiments, the composition comprises less than or equal to 0.1 weight percent of polysiloxane not covalently bound in the poly(phenylene ether)-polysiloxane block copolymer.

In some embodiments, the poly(phenylene ether)-polysiloxane block copolymer reaction product incorporates greater than 75 weight percent, of the hydroxyaryl-terminated polysiloxane starting material into the poly(phenylene ether)-polysiloxane block copolymer. Specifically, the amount of the hydroxyaryl-terminated polysiloxane incorporated into the poly(phenylene ether)-polysiloxane block copolymer can be at least 80 weight percent, more specifically at least 85 weight percent, still more specifically at least 90 weight percent, yet more specifically at least 95 weight percent.

Additional details relating to the preparation, characterization, and properties of the poly(phenylene ether)-polysiloxane block copolymer reaction product can be found in U.S. Pat. No. 8,017,697 to Carrillo et al., and in copending U.S. patent application Ser. No. 13/169,137 of Carrillo et al., filed Jun. 27, 2011.

The composition comprises 1 to 10 weight percent of polysiloxane covalently bound in the poly(phenylene ether)-polysiloxane block copolymer. Within this range, the covalently bound polysiloxane amount can be 2 to 8 weight percent, specifically 3 to 6 weight percent, based on the total weight of the composition. In order for 60 to 95 weight percent of the reaction product to provide 1 to 10 weight percent of bound polysiloxane to the composition, the reaction product can comprise 1 to 17 weight percent siloxane repeating units and 83 to 99 weight percent phenylene ether repeating units, based on the total weight of the reaction product. It will be understood that the siloxane repeating units are derived from the hydroxyaryl-terminated polysiloxane, and the phenylene ether repeating units are derived from the monohydric phenol. In some embodiments, such as, for example, when the poly(phenylene ether)-polysiloxane block copolymer reaction product is purified via precipitation in isopropanol, the siloxane repeating units consist essentially of the residue of hydroxyaryl-terminated polysiloxane that has been incorporated into the poly(phenylene ether)-polysiloxane block copolymer.

In some embodiments, the reaction product comprises 1 to 8 weight percent siloxane repeating units and 12 to 99 weight percent phenylene ether repeating units, based on the total weight of the reaction product. Within these ranges, the amount of siloxane repeating units can be 2 to 7 weight percent, specifically 3 to 6 weight percent, more specifically 4 to 5 weight percent; and the amount of phenylene ether repeating units can be 93 to 98 weight percent, specifically 94 to 97 weight percent, more specifically 95 to 96 weight percent.

The reaction product can include relatively small amounts of very low molecular weight species. Thus, in some embodiments, the reaction product comprises less than 25 weight percent of molecules having a molecular weight less than 10,000 atomic mass units, specifically 5 to 25 weight percent of molecules having a molecular weight less than 10,000 atomic mass units, more specifically 7 to 21 weight percent of molecules having a molecular weight less than 10,000 atomic mass units. In some embodiments, the molecules having a molecular weight less than 10,000 atomic mass units comprise, on average, 5 to 10 weight percent siloxane repeating units, specifically 6 to 9 weight percent siloxane repeating units.

Similarly, the reaction product can also include relatively small amounts of very high molecular weight species. Thus, in some embodiments, the reaction product comprises less than 25 weight percent of molecules having a molecular weight greater than 100,000 atomic mass units, specifically 5 to 25 weight percent of molecules having a molecular weight greater than 100,000 atomic mass units, more specifically 7 to 23 weight percent of molecules having a molecular weight greater than 100,000 atomic mass units. In some embodiments, the molecules having a molecular weight greater than 100,000 atomic mass units comprise, on average, 3 to 6 weight percent siloxane repeating units, specifically 4 to 5 weight percent siloxane repeating units.

In a very specific procedure for preparing the poly(phenylene ether)-polysiloxane block copolymer reaction product, the monohydric phenol is 2,6-dimethylphenol; the hydroxyaryl-terminated polysiloxane is a eugenol-capped polydimethylsiloxane comprising 35 to 60 dimethylsiloxane units; the oxidative copolymerization is conducted with a reaction time of 170 to 220 minutes; and the hydroxyaryl-terminated polysiloxane constitutes 2 to 7 weight percent of the combined weight of the monohydric phenol and the hydroxyaryl-terminated polysiloxane.

The composition comprises 60 to 95 weight percent of the poly(phenylene ether)-polysiloxane block copolymer reaction product, based on the total weight of the composition. With this range, the reaction product amount can be 65 to 90 weight percent, specifically 70 to 85 weight percent, more specifically 75 to 85 weight percent.

In addition to the poly(phenylene ether)-polysiloxane block copolymer reaction product, the composition comprises an impact modifier. An impact modifier is a rubbery polymer that is compatible with the poly(phenylene ether)-polysiloxane block copolymer reaction product and improves the impact resistance of the composition as measured by notched Izod impact strength measured according to ASTM D256 at 23° C. The impact modifier comprises poly(alkenyl aromatic) content and rubber content, and the weight ratio of poly(alkenyl aromatic) content to rubber content is at least 0.5. In some embodiments, the weight ratio of poly(alkenyl aromatic) content to rubber content is 0.5 to 20, specifically 1 to 10, more specifically 2 to 5. As an example, when the impact modifier is rubber-modified polystyrene, the poly(alkenyl aromatic) content consists of polystyrene and the rubber content consists of polybutadiene. As another example, when the impact modifier is a polystyrene-poly(ethylene-butylene)-polystyrene triblock copolymer, the poly(alkenyl aromatic) content consists of polystyrene and the rubber content consists of poly(ethylene-butylene). Suitable impact modifiers include rubber-modified poly(alkenyl aromatic)s (such as rubber-modified polystyrenes, also known as high-impact polystyrenes), unhydrogenated block copolymers of an alkenyl aromatic monomer and a conjugated diene (such as polystyrene-polybutadiene diblock copolymers, polystyrene-polybutadiene-polystyrene triblock copolymers, polystyrene-polyisoprene diblock copolymers, and polystyrene-polyisoprene-polystyrene triblock copolymers), hydrogenated block copolymers of an alkenyl aromatic monomer and a conjugated diene (such as polystyrene-poly-ethylene-butylene) diblock copolymer, polystyrene-poly(ethylene-butylene)-polystyrene triblock copolymers, polystyrene-poly(ethylene-propylene) diblock copolymers, and polystyrene-poly(ethylene-propylene)-polystyrene triblock copolymers), and combinations thereof. Thus, sources of rubber content can include polybutadienes, polybutadiene blocks within block copolymers, polybutadiene grafts within graft copolymers, polyisoprenes, polyisoprene blocks within block copolymers, polyisoprene grafts within graft copolymers, ethylene-propylene copolymer blocks within block copolymers, and ethylene-butylene blocks within block copolymers.

The alkenyl aromatic monomer used to prepare the impact modifier can have the structure

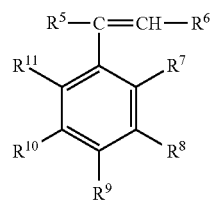

wherein $R^5$ and $R^6$ each independently represent a hydrogen atom, a $C_1$-$C_8$ alkyl group, or a $C_2$-$C_8$ alkenyl group; $R^7$ and $R^{11}$ each independently represent a hydrogen atom, a $C_1$-$C_8$ alkyl group, a chlorine atom, or a bromine atom; and $R^8$, $R^9$, and $R^{10}$ each independently represent a hydrogen atom, a $C_1$-$C_8$ alkyl group, or a $C_2$-$C_8$ alkenyl group, or $R^8$ and $R^9$ are taken together with the central aromatic ring to form a naphthyl group, or $R^9$ and $R^{10}$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the unhydrogenated or hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

In some embodiments, the impact modifier comprises a rubber-modified polystyrene. The rubber-modified polystyrene comprises polystyrene and polybutadiene. Rubber-modified polystyrenes are sometimes referred to as "high-impact polystyrenes" or "HIPS". In some embodiments, the rubber-modified polystyrene comprises 80 to 96 weight percent polystyrene, specifically 88 to 94 weight percent polystyrene; and 4 to 20 weight percent polybutadiene, specifically 6 to 12 weight percent polybutadiene, based on the weight of the rubber-modified polystyrene. In some embodiments, the rubber-modified polystyrene has an effective gel content of 10 to 35 percent. Suitable rubber-modified polystyrenes are commercially available as, for example, HIPS3190 from SABIC Innovative Plastics.

In some embodiments, the impact modifier comprises a hydrogenated block copolymer of an alkenyl aromatic monomer and a conjugated diene. For brevity, this component is referred to as the "hydrogenated block copolymer". The hydrogenated block copolymer can comprise 10 to 90 weight percent of poly(alkenyl aromatic) content and 90 to 10 weight percent of hydrogenated poly(conjugated diene) content, based on the weight of the hydrogenated block copolymer. In some embodiments, the hydrogenated block copolymer is a low poly(alkenyl aromatic content) hydrogenated block copolymer in which the poly(alkenyl aromatic) content is 10 to less than 40 weight percent, specifically 20 to 35 weight percent, more specifically 25 to 35 weight percent, yet more specifically 30 to 35 weight percent, all based on the weight of the low poly(alkenyl aromatic content) hydrogenated block copolymer. In other embodiments, the hydrogenated block copolymer is a high poly(alkenyl aromatic content) hydrogenated block copolymer in which the poly(alkenyl aromatic) content is 40 to 90 weight percent, specifically 50 to 80 weight percent, more specifically 60 to 70 weight percent, all based on the weight of the high poly(alkenyl aromatic content) hydrogenated block copolymer.

In some embodiments, the hydrogenated block copolymer has a weight average molecular weight of 40,000 to 400,000 atomic mass units. The number average molecular weight and the weight average molecular weight can be determined by gel permeation chromatography and based on comparison to polystyrene standards. In some embodiments, the hydrogenated block copolymer has a weight average molecular weight of 200,000 to 400,000 atomic mass units, specifically 220,000 to 350,000 atomic mass units. In other embodiments, the hydrogenated block copolymer has a weight average molecular weight of 40,000 to 200,000 atomic mass units, specifically 40,000 to 180,000 atomic mass units, more specifically 40,000 to 150,000 atomic mass units.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination thereof.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In some embodiments, the hydrogenated block copolymer includes the residue of one or more acid functionalizing agents, such as maleic anhydride. In some embodiments, the hydrogenated block copolymer comprises a polystyrene-poly(ethylene-butylene)-polystyrene triblock copolymer.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Performance Polymers, Inc. as KRATON G1701 (having 37 weight percent polystyrene) and G1702 (having 28 weight percent polystyrene); the polystyrene-poly(ethylene-butylene)-polystyrene triblock copolymers available from Kraton Performance Polymers, Inc. as KRATON G1641 (having 33 weight percent polystyrene), G1651 (having 31-33 weight percent polystyrene), and G1654 (having 31 weight percent polystyrene); and the polystyrene-poly(ethylene-ethylene/propylene)-polystyrene triblock copolymers available from Kuraray as SEPTON S4044, S4055, S4077, and S4099. Additional commercially available hydrogenated block copolymers include polystyrene-poly(ethylene-butylene)-polystyrene (SEBS) triblock copolymers available from Dynasol as CALPRENE CH-6170, CH-7171, CH-6174 and CH-6140, and from Kuraray as SEPTON 8006 and 8007; polystyrene-poly(ethylene-propylene)-polystyrene (SEPS) copolymers available from Kuraray as SEPTON 2006 and 2007; and oil-extended compounds of these hydrogenated block copolymers available from Kraton Performance Polymers, Inc. as KRATON G4609 and G4610 and from Asahi as TUFTEC H1272. Mixtures of two of more hydrogenated block copolymers can be used. In some embodiments, the hydrogenated block copolymer comprises a polystyrene poly(ethylene-butylene)-polystyrene triblock copolymer having a weight average molecular weight of at least 100,000 atomic mass units.

In some embodiments, the impact modifier comprises a rubber-modified polystyrene and a hydrogenated block copolymer of an alkenyl aromatic monomer and a conjugated diene. The hydrogenated block copolymer can be a polystyrene-poly(ethylene-butylene)-polystyrene triblock copolymer having a weight average molecular weight of 200,000 to 400,000 atomic mass units.

The composition comprises the impact modifier in an amount of 5 to 40 weight percent, based on the total weight of the composition. With this range, the impact modifier amount can be 5 to 30 weight percent, specifically 9 to 20 weight percent, more specifically 9 to 15 weight percent, even more specifically 9 to 12 weight percent. In a very specific embodiment, the impact modifier comprises 6 to 10 weight percent of a rubber-modified polystyrene and 1 to 4 weight percent of a polystyrene-poly(ethylene-butylene)-polystyrene triblock copolymer.

In addition to the poly(phenylene ether)-polysiloxane block copolymer reaction product and the impact modifier, the composition can, optionally, further comprise an inorganic filler. Suitable inorganic fillers include, for example, clays, micas, talcs, and combination thereof. In some embodiments, the inorganic filler comprises clay. When present, the inorganic filler can be used in an amount of 4 to 15 weight percent, based on the total weight of the composition. Within this range, the inorganic filler amount can be 5 to 12 weight percent, specifically 6 to 10 weight percent, more specifically 6 to 8 weight percent.

The composition can, optionally, further comprise a poly(ethylene oxide)-poly(propylene oxide)-poly(ethylene oxide) triblock copolymer. Such triblock copolymers are commercially available as, for example, PLURONIC P65, PLURONIC P85, PLURONIC P103, PLURONIC P123, PLURONIC F68, PLURONIC F127, and PLURONIC F88. When present, the poly(ethylene oxide)-poly(propylene oxide)-poly(ethylene oxide) triblock copolymer can be used in an amount of 0.5 to 2 weight percent, based on the total weight of the composition.

The composition can, optionally, further comprise a hydrocarbon resin. Examples of hydrocarbon resins are aliphatic hydrocarbon resins, hydrogenated aliphatic hydrocarbon resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and mixtures thereof. As used herein, "hydrogenated", when referring to the hydrocarbon resin, includes fully, substantially, and partially hydrogenated resins. Suitable aromatic resins include aromatic modified aliphatic resins, aromatic modified cycloaliphatic resins, and hydrogenated aromatic hydrocarbon resins having an aromatic content of 1 to 30 weight percent. Any of the above resins can be grafted with an unsaturated ester or anhydride using methods known in the art. Such grafting can provide enhanced properties to the resin. In one embodiment, the hydrocarbon resin is a hydrogenated aromatic hydrocarbon resin.

Suitable hydrocarbon resins are commercially available and include, for example, EMPR 100, 101, 102, 103, 104, 105, 106, 107, 108, 109, 110, 116, 117, and 118 resins, and OPPERA resins, available from ExxonMobil Chemical Company; ARKON P140, P125, P115, M115, and M135, and SUPER ESTER rosin esters available from Arakawa Chemical Company of Japan; SYLVARES polyterpene resins, styrenated terpene resins and terpene phenolic resins available from Arizona Chemical Company; SYLVATAC and SYLVALITE rosin esters available from Arizona Chemical Company; NORSOLENE aliphatic aromatic resins available from Cray Valley; DERTOPHENE terpene phenolic resins and DERCOLYTE polyterpene resins available from DRT Chemical Company, EASTOTAC resins, PICCOTAC resins, REGALITE and REGALREZ hydrogenated cycloaliphatic/aromatic resins, and PICCOLYTE and PERMALYN polyterpene resins, rosins, and rosin esters available from Eastman Chemical Company; WINGTACK resins available from Goodyear Chemical Company; coumarone/indene resins available from Neville Chemical Company, QUINTONE acid modified C5 resins, C5/C9 resins, and acid-modified C5/C9 resins available from Nippon Zeon; and CLEARON hydrogenated terpene resins available from Yasuhara.

When present, the hydrocarbon resin can be used in an amount of 0.5 to 6 weight percent, based on the total weight of the composition. Within this range, the hydrocarbon resin amount can be 0.5 to 4 weight percent, specifically 1 to 3 weight percent.

The composition comprises less than or equal to 0.5 weight percent of organophosphate esters, based on the total weight of the composition. Organophosphate esters are known flame retardants and include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the composition comprises less than or equal to 0.2 weight percent of organophosphate esters, specifically less than or equal to 0.1 weight percent of organophosphate esters. In some embodiments, the composition excludes organophosphate esters.

The composition comprises less than or equal to 0.5 weight percent of halogens. Halogens include fluorine, chloride, bromine, iodine, and astatine. In some embodiments, the composition comprises less than or equal to 0.2 weight percent of halogens, specifically less than or equal to 0.1 weight percent of halogens. In some embodiments, the composition excludes halogens.

The composition can, optionally, comprise less than or equal than 2 weight percent, specifically less than or equal to 1 weight percent, of each of homopolystyrenes, polyamides, polyolefins, polyesters, and unhydrogenated block copolymers of an alkenyl aromatic monomer and a conjugated diene. In this context, "polyolefins" are defined as homopolymers and copolymers of monomers consisting of $C_2$-$C_{12}$ monoalkenes. Polyolefins include, for example, homopolyethylenes, homopolypropylenes, ethylene-propylene copolymers, ethylene-butene copolymers, and ethylene-octene copolymers. Polyolefins do not include poly(conjugated diene)s, nor do polyolefins include blocks or grafts present in copolymers that further include the residue of monomers other than $C_2$-$C_{12}$ monoalkenes. In some embodiments, homopolystyrenes, polyamides, polyolefins, polyesters, and unhydrogenated block copolymers are excluded from the composition.

The composition can, optionally, exclude copolymers of an alkenyl aromatic monomer (also known as a vinyl aromatic compound) and an $\alpha,\beta$-unsaturated cyclic anhydride. Such copolymers are described in U.S. Pat. No. 6,165,309 to Burnell et al.

An important advantage of the invention is that it provides good flame retardancy while minimizing or eliminating the use of flame retardant additives. Thus, the composition can, optionally, comprise less than or equal to 1 weight percent total of flame retardants selected from the group consisting of organophosphate esters, metal dialkylphosphinates, melamine phosphate, melamine pyrophosphate, melamine polyphosphates, and metal hydroxides. In some embodiments, these flame retardants are excluded.

In a very specific embodiment, the composition comprises 75 to 85 weight percent of the poly(phenylene ether)-polysiloxane block copolymer reaction product; the composition comprises 3 to 6 weight percent of polysiloxane covalently bound in the poly(phenylene ether)-polysiloxane block copolymer; the composition comprises 75 to 85 weight percent of the poly(phenylene ether)-polysiloxane block copolymer reaction product; the composition comprises 7 to 14 weight percent of the impact modifier; the impact modifier comprises 6 to 10 weight percent of a rubber-modified polystyrene and 1 to 4 weight percent of a polystyrene-poly(ethylene-butylene)-polystyrene triblock copolymer; the composition further comprises 5 to 10 weight percent of an inorganic filler comprising clay; the composition comprises less than or equal to 1 weight percent of (or excludes) each of homopolystyrenes, polyamides, polyolefins, polyesters, and unhydrogenated block copolymers of an alkenyl aromatic monomer and a conjugated diene; and the composition comprises less than or equal to 1 weight percent total of flame retardants selected from the group consisting of organophosphate esters, metal dialkylphosphinates, melamine phosphate, melamine pyrophosphate, melamine polyphosphates, and metal hydroxides.

The composition can be prepared by melt-blending or melt-kneading the individual components together. The melt-blending or melt-kneading can be performed using common equipment such as ribbon blenders, Henschel mixers, Banbury mixers, drum tumblers, single-screw extruders, twin-screw extruders, multi-screw extruders, co-kneaders, and the like. For example, the present composition can be prepared by melt-blending the components in a twin-screw extruder at a temperature of 280 to 360° C., specifically 300 to 330° C.

The composition is useful for forming articles by shaping, extruding, or molding. In particular, articles can be molded from the composition by known processes, such as injection molding, injection compression molding, gas assist injection molding, rotary molding, blow molding, compression molding and related molding processes. A specific injection molding procedure applicable to the compositions is described in the working examples below. Because the composition minimizes or eliminates the use of flame retardant additives, it is particularly suited for forming articles suitable for food contact or medical use.

The invention includes at least the following embodiments.

Embodiment 1

A composition comprising: 60 to 95 weight percent of a poly(phenylene ether)-polysiloxane block copolymer reaction product comprising a poly(phenylene ether) and a poly (phenylene ether)-polysiloxane block copolymer; and 5 to 40 weight percent of an impact modifier; wherein the impact modifier comprises poly(alkenyl aromatic) content and rubber content, and wherein the weight ratio of poly(alkenyl aromatic) content to rubber content is at least 0.5; wherein the composition comprises 1 to 10 weight percent of polysiloxane covalently bound in the poly(phenylene ether)-polysiloxane block copolymer; wherein the composition comprises less than or equal to 10 parts by weight of polysiloxane not covalently bound in the poly(phenylene ether)-polysiloxane block copolymer relative to 100 parts by weight of polysiloxane covalently bound in the poly(phenylene ether)-polysiloxane block copolymer; wherein the composition comprises less than or equal to 0.5 weight percent of organophosphate esters; wherein the composition comprises less than or equal to 0.5 weight percent of halogens; and wherein all weight percents are based on the total weight of the composition.

Embodiment 2

The composition of embodiment 1, exhibiting a flammability rating of V-1 or V-0 at a sample thickness less than or equal to 3.0 millimeters in the 20 millimeter Vertical Burning Flame Test of Underwriter's Laboratory Bulletin 94 "Tests for Flammability of Plastic Materials, UL 94", a heat deflection temperature of at least 128° C. determined according to ASTM D 648-07 using a stress of 1.82 megapascals (MPa) and a sample thickness of 3.2 millimeters, and a notched Izod impact strength of at least 150 joules/meter determined according to ASTM D 256-10 at 23° C. using a pendulum energy of 2.7 joules and an impact velocity of 3.5 meters per second.

Embodiment 3

The composition of embodiment 1 or 2, further comprising 4 to 15 weight percent of an inorganic filler selected from the group consisting of clays, micas, talcs, and combination thereof.

Embodiment 4

The composition of any of embodiments 1-3, wherein the impact modifier comprises a rubber-modified polystyrene.

Embodiment 5

The composition of any of embodiments 1-4, wherein the impact modifier comprises a hydrogenated block copolymer of an alkenyl aromatic monomer and a conjugated diene.

Embodiment 6

The composition of any of embodiments 1-5, wherein the impact modifier comprises a rubber-modified polystyrene and a hydrogenated block copolymer of an alkenyl aromatic monomer and a conjugated diene.

Embodiment 7

The composition of any of embodiments 1-6, wherein the composition comprises less than or equal to 0.1 weight percent of polysiloxane not covalently bound in the poly(phenylene ether)-polysiloxane block copolymer.

Embodiment 8

The composition of any of embodiments 1-7, further comprising 0.5 to 2 weight percent of a poly(ethylene oxide)-poly(propylene oxide)-poly(ethylene oxide) triblock copolymer.

Embodiment 9

The composition of any of embodiments 1-8, further comprising 0.5 to 6 weight percent of a hydrocarbon resin.

Embodiment 10

The composition of any of embodiments 1-9, comprising less than or equal to 2 weight percent of each of homopolystyrenes, polyamides, polyolefins, polyesters, and unhydrogenated block copolymers of an alkenyl aromatic monomer and a conjugated diene.

Embodiment 11

The composition of any of embodiments 1-10, comprising less than or equal to 1 weight percent total of flame retardants selected from the group consisting of organophosphate esters, metal dialkylphosphinates, melamine phosphate, melamine pyrophosphate, melamine polyphosphates, and metal hydroxides.

Embodiment 12

The composition of embodiment 1, wherein the composition comprises 75 to 85 weight percent of the poly(phenylene ether)-polysiloxane block copolymer reaction product; wherein the composition comprises 3 to 6 weight percent of polysiloxane covalently bound in the poly(phenylene ether)-polysiloxane block copolymer; wherein the composition comprises 7 to 14 weight percent of the impact modifier; wherein the impact modifier comprises 6 to 10 weight percent of a rubber-modified polystyrene and 1 to 4 weight percent of a polystyrene-poly(ethylene-butylene)-polystyrene triblock copolymer; wherein the composition further comprises 5 to 10 weight percent of an inorganic filler comprising clay; and wherein the composition comprises less than or equal to 1 weight percent total of flame retardants selected from the group consisting of organophosphate esters, metal dialkylphosphinates, melamine phosphate, melamine pyrophosphate, melamine polyphosphates, and metal hydroxides.

Embodiment 12a

A composition comprising: 75 to 85 weight percent of a poly(phenylene ether)-polysiloxane block copolymer reaction product comprising a poly(phenylene ether) and a poly(phenylene ether)-polysiloxane block copolymer, wherein the composition comprises 3 to 6 weight percent of polysiloxane covalently bound in the poly(phenylene ether)-polysiloxane block copolymer, wherein the composition comprises less than or equal to 10 parts by weight of polysiloxane not covalently bound in the poly(phenylene ether)-polysiloxane block copolymer relative to 100 parts by weight of polysiloxane covalently bound in the poly(phenylene ether)-polysiloxane block copolymer; 7 to 14 weight percent of an impact modifier; wherein the impact modifier comprises poly(alkenyl aromatic) content and rubber content, and wherein the weight ratio of poly(alkenyl aromatic) content to rubber content is at least 0.5; wherein the impact modifier comprises 6 to 10 weight percent of a rubber-modified polystyrene and 1 to 4 weight percent of a polystyrene-poly(ethylene-butylene)-polystyrene triblock copolymer; and 5 to 10 weight percent of an inorganic filler comprising clay; wherein the composition comprises less than or equal to 0.5 weight percent of organophosphate esters; wherein the composition comprises less than or equal to 0.5 weight percent of halogens; wherein the composition comprises less than or equal to 1 weight percent total of flame retardants selected from the group consisting of organophosphate esters, metal dialkylphosphinates, melamine phosphate, melamine pyrophosphate, melamine polyphosphates, and metal hydroxides; and wherein all weight percents are based on the total weight of the composition.

Embodiment 13

The composition of embodiment 12, comprising less than or equal to 2 weight percent of each of homopolystyrenes, polyamides, polyolefins, polyesters, and unhydrogenated block copolymers of an alkenyl aromatic monomer and a conjugated diene.

Embodiment 14

An article comprising the composition of any of embodiments 1-13.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Preparative Examples 1 and 2

These examples describe the synthesis of two poly(phenylene ether)-polysiloxane block copolymer reaction products corresponding to Examples 9 and 16 of U.S. Pat. No. 8,017,697.

Reaction conditions are summarized in Table 1, where "DMBA level (%)" is the concentration of dimethyl-n-butylamine, expressed as a weight percent relative to the weight of toluene; "Solids (%)" is the weight of total 2,6-dimethylphenol and eugenol-capped polysiloxane, expressed as a weight percent relative to the sum of the weights of 2,6-dimethylphenol, eugenol-capped polysiloxane, and toluene; "Polysiloxane chain length" is the average number of dimethylsiloxane (—Si(CH$_3$)$_2$O—) units in the eugenol-capped polysiloxane; "Polysiloxane loading (%)" is the weight percent of eugenol-capped polysiloxane in the reaction mixture, based on the total weight of the eugenol-capped polysiloxane and the 2,6-dimethylphenol; "Initial 2,6-dimethylphenol (%)" is the weight percent of 2,6-dimethylphenol present in the reaction vessel at the initiation of polymerization (the introduction of oxygen to the reaction vessel), relative to the total weight of 2,6-dimethylphenol; "O:2,6-dimethylphenol mole ratio" is the mole ratio of atomic oxygen (provided as molecular oxygen) to 2,6-dimethylphenol maintained during the addition of 2,6-dimethylphenol; "Temp., initial charge (° C.)" is the temperature, in degrees Celsius, of the reaction mixture when the initial charge of monomer was added to the reaction vessel, and when oxygen was first introduced to the reaction mixture; "Temp., addition (° C.)" is the reaction temperature during further addition of 2,6-dimethylphenol; "Temp., build (° C.)" is the temperature, expressed in degrees Celsius, during the build phase of the reaction; "Ramp time (min)" is the time, expressed in minutes, during which the temperature was ramped from the addition temperature to the build temperature; "Ramp slope (° C./min)" is the rate of change of temperature, expressed in degrees Celsius per minute, during the period in which the temperature was ramped from the addition temperature to the build temperature; "Reaction time (min)" is the total reaction time, expressed in minutes, elapsed between the moment of oxygen introduction and the moment of oxygen cut-off. Other than the monomer initially present in the reactor, monomer was added from 40 to 80 minutes relative to the start of reaction (that is, from the initiation of oxygen flow) at 0 minutes. Build time is measured from the end of controlled monomer addition to the end of reaction (that is, to the termination of oxygen flow). Build time was varied between 80 and 160 minutes.

The reactor and the 2,6-dimethylphenol addition tank were rinsed with warm toluene to assure their cleanliness. The reaction was purged with nitrogen to achieve an oxygen concentration of less than 1%. The reactor was charged with toluene, and this toluene was stirred at 500 rotations per minute (rpm). The temperature of the initial toluene was adjusted to the "initial charge" temperature of 21° C. and maintained at that temperature during addition of the initial charge of 2,6-dimethylphenol from the addition tank to the reaction vessel. After the addition of the initial charge of 2,6-dimethylphenol was complete, the reaction vessel was charged with the eugenol-capped polydimethylsiloxane, the di-n-butylamine, the dimethyl-n-butylamine, the diamine, and a copper catalyst prepared from cuprous oxide and hydrobromic acid. Oxygen flow and further monomer addition were initiated, and the oxygen flow was regulated to maintain a head space concentration less than 17 percent. During further monomer addition, cooling water supply temperature was adjusted to maintain the temperature specified as "Temp, addition (° C.)" in Table 1. After monomer addition was complete, the monomer addition line was flushed with toluene and the reaction temperature was increased to the temperature specified as "Temp, build (° C.)" in Table 1. This temperature adjustment was conducted over the time period specified as "Ramp time (min)", and at the rate specified as "Ramp slope (° C./min)" in Table 1. The reaction was continued until a pre-determined time point was reached. The pre-determined end point is the time at which target intrinsic viscosity and maximum polysiloxane incorporation are attained and is typically 80 to 160 minutes after 2,6-dimethylphenyl addition ends. Once this time point was reached, the oxygen flow was stopped. The reaction mixture was then heated to 60° C. and pumped to a chelation tank containing aqueous chelant solution. The resulting mixture was stirred and held at 60° C. for one hour. The light (organic) and heavy (aqueous) phases were separated by decantation, and the heavy phase was discarded. A small portion of the light phase was sampled and precipitated with isopropanol for analysis, and the remainder of the light phase was pumped to a precipitation tank and combined with methanol antisolvent in a weight ratio of 3 parts antisolvent to 1 part light phase. The precipitate was filtered to form a wet cake, which was reslurried three times with the same antisolvent and dried under nitrogen until a toluene concentration less than 1 weight percent was obtained.

For the product properties in Table 1, "Mol. Wt. <10K (%)" is the weight percent of the isolated product having a molecular weight less than 10,000 atomic mass units, as determined by gel permeation chromatography; "Mol. Wt. >100K (%)" is the weight percent of the isolated product having a molecular weight greater than 10,000 atomic mass units, as determined by gel permeation chromatography; "IV, end of rxn. (dL/g)" is the intrinsic viscosity, expressed in deciliters per gram and measured by Ubbelohde viscometer at 25° C. in chloroform, of dried powder isolated by precipitation from isopropanol; "IV, end of cheln. (dL/g)" expressed in deciliters per gram and measured by Ubbelohde viscometer at 25° C. in chloroform, of the product present in the post-chelation organic phase which has been isolated by precipitation from isopropanol then dried; "$M_w$, end of rxn. (AMU)" is the weight average molecular weight, expressed in atomic mass units and measured by gel permeation chromatography, of the product present in the reaction mixture at the end of the polymerization reaction which has been isolated by precipitation from isopropanol then dried; "$M_n$, end of rxn. (AMU)" is the number average molecular weight, expressed in atomic mass units and measured by gel permeation chromatography, of the product present in the reaction mixture at the end of the polymerization reaction which has been isolated by precipitation from isopropanol then dried; "$M_w/M_n$, end of rxn." is the ratio of weight average molecular weight to number average molecular weight for the product present in the reaction mixture at the end of the polymerization reaction which has been isolated by precipitation from isopropanol then dried; "$M_w$, end of cheln. (AMU)" is the weight average molecular weight, expressed in atomic mass units and measured by gel permeation chromatography, of the product present in the post-chelation organic phase which has been isolated by precipitation from isopropanol then dried; "$M_n$, end of cheln. (AMU)" is the number average molecular weight, expressed in atomic mass units and measured by gel permeation chromatography, of the product present in the post-chelation organic phase which has been isolated by precipitation from isopropanol then dried; "$M_w/M_n$, end of cheln." is the ratio of weight average molecular weight to number average molecular weight for the product present in the post-chelation organic phase which has been isolated by precipitation from isopropanol then dried; "Weight % siloxane (%)" is the weight percent of dimethylsiloxane units in the isolated product, based on the total weight of 2,6-dimethyl-1,4-phenylene ether units and dimethylsiloxane units in the isolated product., as determined by $^1$H NMR; "Siloxane Incorporation Efficiency (%)" is the weight percent of dimethylsiloxane units in the isolated product compared to the weight percent of dimethylsiloxane units in the total monomer composition, as determined by $^1$H NMR; "Weight % Biphenyl (%)" is the weight percent of 3,3',5,5'-tetramethyl-4,4'-biphenol residues in the isolated product, as determined by $^1$H NMR. Details of $^1$H NMR methods can be found in U.S. Pat. No. 8,017,697.

TABLE 1

|  | P. Ex. 1 | P. Ex. 2 |
| --- | --- | --- |
| REACTION CONDITIONS |  |  |
| DMBA level (%) | 1.2 | 1.2 |
| Solids (%) | 23 | 23 |
| Polysiloxane chain length | 45 | 45 |
| Polysiloxane loading (%) | 5 | 5 |
| Initial 2,6-DMP (%) | 7.9 | 7.9 |
| O:2,6-dimethylphenol mole ratio | 0.98 | 0.98 |
| Catalyst (%) | 0.75 | 0.75 |
| Temp., initial charge (° C.) | 21 | 21 |
| Temp., addition (° C.) | 38 | 38 |
| Temp., build (° C.) | 49 | 49 |
| Ramp time (min) | 30 | 30 |
| Ramp slope (° C./min) | 0.37 | 0.37 |
| Reaction time (min) | 150 | 200 |
| FINAL PRODUCT PROPERTIES |  |  |
| Mol. Wt. <10K (%) | 11 | 13 |
| Mol. Wt. >100K (%) | 16 | 19 |
| IV, end of rxn. (dL/g) | 0.45 | 0.53 |
| IV, end of cheln. (dL/g) | 0.39 | 0.46 |
| $M_w$, end of rxn. (AMU) | 64000 | 72000 |
| $M_n$, end of rxn. (AMU) | 23000 | 27000 |
| $M_w/M_n$, end of rxn. | 2.8 | 2.7 |
| $M_w$, end of cheln. (AMU) | 56000 | 67000 |
| $M_n$, end of cheln. (AMU) | 20000 | 23000 |
| $M_w/M_n$, end of cheln. | 2.7 | 2.9 |
| Weight % siloxane (%) | 4.78 | 4.9 |
| Silox. Incorp. Effic. (%) | 96 | 98 |
| Weight % Biphenyl (%) | 1.26 | 1.16 |

Examples 1-10

Comparative Examples 1-15

These examples illustrate the desirable balance of flame retardancy, impact strength, and heat resistance provided by the composition. Components used in these examples are summarized in Table 2.

TABLE 2

| Material | Description |
| --- | --- |
| PPE 0.40 | Poly(2,6-dimethyl-1,4-phenylene ether), CAS Reg. No. 24938-67-8, having an intrinsic viscosity of about 0.40 deciliter per gram as measured in chloroform at 25° C.; obtained as PPO 640 from SABIC Innovative Plastics. |
| PPE 0.46 | Poly(2,6-dimethyl-1,4-phenylene ether), CAS Reg. No. 24938-67-8, having an intrinsic viscosity of about 0.46 deciliter per gram as measured in chloroform at 25° C.; obtained as PPO 646 from SABIC Innovative Plastics. |
| PPE-Si 0.39 | Poly(phenylene ether)-polysiloxane block copolymer reaction product, prepared as described in Preparative Example 1 and having a polysiloxane content of 4.8% and an intrinsic viscosity of about 0.39 deciliter/gram as measured in chloroform at 25° C.. |
| PPE-Si 0.46 | Poly(phenylene ether)-polysiloxane block copolymer reaction product, prepared as described in Preparative Example 2 and having a polysiloxane content of 4.9% and an intrinsic viscosity of about 0.46 deciliter/gram as measured in chloroform at 25° C.. |
| HIPS | High impact polystyrene (rubber-modified polystyrene), CAS Reg. No. 9003-55-8, having a polybutadiene content of about 10 weight percent; obtained as HIPS 3190 from SABIC Innovative Plastics |
| SEBS | Polystyrene-poly(ethylene/butylene)-polystyrene triblock copolymer, CAS Reg. No. 66070-58-4, having a polystyrene content of about 30-33 weight percent and a weight average molecular weight of 240,000-301,000; obtained as KRATON G1651 from Kraton Performance Polymers Inc.. |

TABLE 2-continued

| Material | Description |
| --- | --- |
| Hydrocarbon resin | Hydrocarbon resin, CAS Reg. No. 123465-34-9; obtained as ARKON P-125 from Arakawa Chemical Industries, Ltd. in pellet form and ground to a powder before use. |
| F88 | Poly(ethylene oxide)-poly(propylene oxide)-poly(ethylene oxide) triblock copolymer, CAS Reg. No. 691397-13-4, having an average molecular weight of 11,400; obtained as PLURONIC F88 from BASF Corp. |
| Eu-Si | α-Dimethyl-3-(4'-hydroxy-3'-methoxyphenyl)propylsilyloxy, ω-3-dimethyl-3-(4'-hydroxy-3'-methoxyphenyl)propylsilyl polydimethylsiloxane (eugenol-diterminated polydimethylsiloxane), CAS Reg. No. 156065-00-8, having an average of about 45 dimethylsiloxane repeat units per molecule, obtained from Momentive Performance Materials Inc. |
| SF1706 | Aminoethylaminopropylpolysiloxane, CAS Reg. No. 67923-07-3, having a viscosity of 10 to 50 centistokes at 23° C. and an amine equivalent concentration of 0.48 milliequivalents/gram; obtained as SF1706 from Momentive Performance Materials Inc. |
| DCP | Dicumyl peroxide, CAS Reg. No. 80-43-3; obtained from Acros Organics. |
| Clay | Water-washed kaolin clay having a platy morphology and a median particle size of about 0.4 micrometer; obtained as KaMin HG90 from Kamin LLC. |
| Additives | A mixture of linear low density polyethylene, CAS Reg. No. 25087-34-7, triisodecyl phosphite, CAS Reg. No. 25448-25-3, zinc sulfide, CAS Reg. No. 1314-98-3, and zinc oxide, CAS Reg. No. 1314-13-2. |

Inventive and comparative compositions are summarized in Table 3, where all component amounts are in parts by weight. The compositions were prepared from individual components as follows. Components were compounded in a ZSK-28 mega compounder having a 28 millimeter internal diameter and operating with barrel temperatures less than or equal to 350° C. All components were added at the feed throat of the extruder. The extrudate was pelletized, and the pellets dried at 80° C. for four hours prior to subsequent use for injection molding. The compositions were injection molded into articles for physical testing. Injection molding was conducted on a Van Dorn 85T injection molding machine for flame bars and 120T injection molding machine for all other parts. Barrel temperatures of 580° F. (304.4° C.) and a mold temperature of 190° F. (87.7° C.) were used for injection molding. For Comparative Examples 8 and 9, parts could not be injection molded because the pellets made from these blends were oily and did not feed into the injection molding screw.

Flame retardancy of injection molded flame bars was determined according to Underwriter's Laboratory Bulletin 94 "Tests for Flammability of Plastic Materials, UL 94", 20 millimeter Vertical Burning Flame Test. Before testing, flame bars with a thickness of 1.5 millimeters (except where otherwise stated) were conditioned at 23° C. and 50% relative humidity for at least 48 hours. For each composition, a set of ten flame bars was tested. For each bar, a flame was applied to the bar then removed, and the time required for the bar to self-extinguish (first afterflame time, t1) was noted. The flame was then reapplied and removed, and the time required for the bar to self-extinguish (second afterflame time, t2) and the post-flame glowing time (afterglow time, t3) were noted. In Table 3, "Avg. FOT (sec)" was the average flame-out time, which is the sum of t1 and t2 for all ten samples, divided by 20. To achieve a rating of V-0, the afterflame times t1 and t2 for each individual specimen must have been less than or equal to 10 seconds; and the total afterflame time for all ten specimens (t1 plus t2 for all ten specimens) must have been less than or equal to 100 seconds; and the second afterflame time plus the afterglow time for each individual specimen (t2+t3) must have been less than or equal to 30 seconds; and no specimen can have flamed or glowed up to the holding clamp; and the cotton indicator cannot have been ignited by flaming particles or drops. To achieve a rating of V-1, the afterflame times t1 and t2 for each individual specimen must have been less than or equal to 30 seconds; and the total afterflame time for all ten specimens (t1 plus t2 for all ten specimens) must have been less than or equal to 500 seconds; and the second afterflame time plus the afterglow time for each individual specimen (t2+t3) must have been less than or equal to 60 seconds; and no specimen can have flamed or glowed up to the holding clamp; and the cotton indicator cannot have been ignited by flaming particles or drops. To achieve a rating of V-2, the afterflame times t1 and t2 for each individual specimen must have been less than or equal to 30 seconds; and the total afterflame time for all ten specimens (t1 plus t2 for all ten specimens) must have been less than or equal to 500 seconds; and the second afterflame time plus the afterglow time for each individual specimen (t2+t3) must have been less than or equal to 60 seconds; and no specimen can have flamed or glowed up to the holding clamp; but the cotton indicator can have been ignited by flaming particles or drops.

Heat deflection temperature values ("HDT (° C.)" in Table 3), expressed in units of degrees Celsius, were determined according to ASTM D 648-07 using a stress of 1.82 megapascals (MPa) and a sample thickness of 3.2 millimeters (mm) Notched Izod impact strength (NII) values ("NII, 23° C. (J/m)" and "NII, −30° C. (J/m)" in Table 3), expressed in units of joules/meter, were determined according to ASTM D 256-10 at 23° C. or −30° C., using a pendulum energy of 2.7 joules (J) and an impact velocity of 3.5 meters per second (m/sec). Tensile modulus values ("Tens. Mod., 23° C. (MPa)" in Table 3), expressed in units of megapascals, were determined at 23° C. according to ASTM D638-08, using a Type I bar having a thickness of 3.2 millimeters. Flexural modulus values ("Flex. Mod., 23° C. (MPa)" in Table 3), expressed in units of megapascals, were determined at 23° C. according to ASTM D790-10 using samples having cross-sectional dimensions of 3.2 by 12.7 millimeters. Melt flow rate values ("Melt Flow Rate, 300° C., 5 kg (g/10 min)" in Table 3), expressed in units of grams per 10 minutes, were determined according to ASTM D1238-04 at a temperature of 300° C. and a load of 5 kilograms.

The results in Table 3 show that inventive Examples 1-10 each exhibit a UL 94 V-1 or V-0 flammability rating along with good impact resistance and heat resistance while containing no organophosphate ester or halogenated flame retardant. Specifically, inventive Examples 1-10 each exhibit a flammability rating of V-1 or V-0 at a thickness of 1.5 or 3.0 millimeters, a heat deflection temperature of at least 128° C., and a 23° C. notched Izod impact strength of at least 150 joules/meter. The property balance of the inventive examples is further improved by the combination of added clay and a poly(phenylene ether)-polysiloxane block copolymer reaction product content of at least 65 weight percent, which is associated with V-0 values in Examples 2 and 7-9 (but not Example 11). The best property balances are exhibited by inventive Examples 6-8, which each exhibit a V-0 flammability rating at a sample thickness of 1.5 millimeters, a heat deflection temperature of at least 157° C., and a 23° C. notched Izod impact strength of at least 325 joules/meter.

TABLE 3

|  | C. Ex. 1 | Ex. 1 | C. Ex. 2 | Ex. 2 | C. Ex. 3 | Ex. 3 | C. Ex. 4 |
|---|---|---|---|---|---|---|---|
| Compositions | | | | | | | |
| PPE 0.46 | 0 | 0 | 0 | 0 | 0 | 0 | 0 |
| PPE-Si 0.46 | 0 | 0 | 0 | 0 | 0 | 0 | 0 |
| PPE 0.40 | 88.20 | 0 | 79.38 | 0 | 68.60 | 0 | 61.74 |
| PPE-Si 0.39 | 0 | 88.20 | 0 | 79.38 | 0 | 68.60 | 0 |
| HIPS | 7.84 | 7.84 | 7.06 | 7.06 | 23.52 | 23.52 | 21.17 |
| SEBS | 1.96 | 1.96 | 1.76 | 1.76 | 5.88 | 5.88 | 5.29 |
| Clay | 0 | 0 | 9.80 | 9.80 | 0 | 0 | 9.80 |
| Hydrocarbon resin | 0 | 0 | 0 | 0 | 0 | 0 | 0 |
| F88 | 0 | 0 | 0 | 0 | 0 | 0 | 0 |
| Eu-Si | 0 | 0 | 0 | 0 | 0 | 0 | 0 |
| DCP | 0 | 0 | 0 | 0 | 0 | 0 | 0 |
| SF1706 | 0 | 0 | 0 | 0 | 0 | 0 | 0 |
| Additives | 2.00 | 2.00 | 2.00 | 2.00 | 2.00 | 2.00 | 2.00 |
| Flammability Properties (1.5 mm thick bars) | | | | | | | |
| Avg. FOT (sec) | 7.46 | 6.41 | 6.84 | 3.32 | 16.72 | 13.69 | |
| Rating | V-1 | V-1 | V-1 | V-0 | Fail | V-1 | |
| Thermal and Mechanical Properties | | | | | | | |
| HDT (° C.) | 168 | 157 | 173 | 165 | 145 | 137 | 149 |
| NII, 23° C. (J/m) | 95.9 | 289 | 178 | 282 | 322 | 408 | 180 |
| NII, −30° C. (J/m) | 64.5 | 115 | 112 | 107 | 195 | 222 | 113 |
| Tens. Mod., 23° C. (MPa) | — | | | | | | |
| Flex. Mod., 23° C. (MPa) | | | | | | | |
| Melt Flow Rate, 300° C., 5 kg (g/10 min) | 5.78 | 4.91 | 4.50 | 3.67 | 10.02 | 11.24 | 8.30 |

|  | Ex. 4 | C. Ex. 5 | Ex. 5 | C. Ex. 6 | C. Ex. 7 | C. Ex. 8 | Ex. 6 |
|---|---|---|---|---|---|---|---|
| Compositions | | | | | | | |
| PPE 0.46 | 0 | 0 | 0 | 0 | 0 | 0 | 0 |
| PPE-Si 0.46 | 0 | 0 | 0 | 0 | 0 | 0 | 0 |
| PPE 0.40 | 0 | 61.25 | 0 | 55.17 | 0 | 0 | 0 |
| PPE-Si 0.39 | 61.74 | 0 | 61.25 | 0 | 55.17 | 48.51 | 80.85 |
| HIPS | 21.17 | 29.40 | 29.40 | 26.46 | 26.46 | 31.75 | 7.84 |
| SEBS | 5.29 | 7.35 | 7.35 | 6.66 | 6.66 | 7.94 | 1.96 |
| Clay | 9.80 | 0 | 0 | 9.80 | 9.80 | 9.80 | 7.35 |
| Hydrocarbon resin | 0 | 0 | 0 | 0 | 0 | 0 | 0 |
| F88 | 0 | 0 | 0 | 0 | 0 | 0 | 0 |
| Eu-Si | 0 | 0 | 0 | 0 | 0 | 0 | 0 |
| DCP | 0 | 0 | 0 | 0 | 0 | 0 | 0 |
| SF1706 | 0 | 0 | 0 | 0 | 0 | 0 | 0 |
| Additives | 2.00 | 2.00 | 2.00 | 2.00 | 2.00 | 2.00 | 2.00 |
| Flammability Properties (1.5 mm thick bars, except Ex. 5 and C. Exs. 5-8 at 3.0 mm) | | | | | | | |
| Avg. FOT (sec) | 11.66 | 7.87 | 7.87 | 7.08 | 7.08 | 8.50 | 2.10 |
| Rating | V-1 | V-1 | V-1 | Fail | V-1 | V-1 | V-0 |
| Thermal and Mechanical Properties | | | | | | | |
| HDT (° C.) | 142 | 137 | 129 | 137 | 126 | 122 | 160 |
| NII, 23° C. (J/m) | 163 | 340 | 462 | 210 | 215 | 225 | 325 |
| NII, −30° C. (J/m) | 131 | 198 | 304 | 132 | 126 | 134 | 168 |
| Tens. Mod., 23° C. (MPa) | | 1984 | 1986 | 2478 | 2320 | 2770 | 2520 |
| Flex. Mod., 23° C. (MPa) | | 2490 | 2310 | 2870 | 2750 | 2380 | 2860 |
| Melt Flow Rate, 300° C., 5 kg (g/10 min) | 6.07 | 13.7 | 10.3 | 10.4 | 10.1 | 10.7 | 5.7 |

|  | Ex. 7 | Ex. 8 | C. Ex. 9 | C. Ex. 10 | C. Ex. 11 | Ex. 9 | C. Ex. 12 |
|---|---|---|---|---|---|---|---|
| Compositions | | | | | | | |
| PPE 0.46 | 0 | 0 | 0 | 0 | 0 | 0 | 0 |
| PPE-Si 0.46 | 0 | 0 | 0 | 0 | 0 | 0 | 0 |
| PPE 0.40 | 0 | 0 | 92.12 | 82.91 | 83.79 | 0 | 0 |
| PPE-Si 0.39 | 80.07 | 79.18 | 0 | 0 | 0 | 80.85 | 80.85 |
| HIPS | 7.74 | 7.64 | 0 | 7.84 | 7.84 | 9.80 | 0 |
| SEBS | 1.96 | 1.96 | 0 | 1.96 | 1.96 | 0 | 9.80 |

TABLE 3-continued

| | | | | | | | |
|---|---|---|---|---|---|---|---|
| Clay | 7.25 | 7.15 | 0 | 0 | 0 | 7.35 | 7.35 |
| Hydrocarbon resin | 0 | 1.96 | 0 | 0 | 0 | 0 | 0 |
| F88 | 0.98 | 0 | 0 | 0 | 0 | 0 | 0 |
| Eu-Si | 0 | 0 | 4.90 | 4.41 | 0 | 0 | 0 |
| DCP | 0 | 0 | 0.98 | 0.88 | 0 | 0 | 0 |
| SF1706 | 0 | 0 | 0 | 0 | 4.41 | 0 | 0 |
| Additives | 2.00 | 2.00 | 2.00 | 2.00 | 2.00 | 2.00 | 2.00 |
| Flammability Properties (1.5 mm thick bars) | | | | | | | |
| Avg. FOT (sec) | 2.08 | 2.06 | * | * | 4.4 | 6.6 | 7.9 |
| Rating | V-0 | V-0 | * | * | V-1 | V-1 | Fail |
| Thermal and Mechanical Properties | | | | | | | |
| HDT (° C.) | 157 | 158 | * | * | 158 | | 159 |
| NII, 23° C. (J/m) | 326 | 332 | * | * | 200 | | 158 |
| NII, −30° C. (J/m) | 135 | 156 | * | * | 108 | | 117 |
| Tens. Mod., 23° C. (MPa) | 2512 | 2508 | * | * | 2494 | | 3034 |
| Flex. Mod., 23° C. (MPa) | 2870 | 2870 | * | * | 2500 | | 2840 |
| Melt Flow Rate, 300° C., 5 kg (g/10 min) | 7.4 | 7.0 | * | * | | | |

| | C. Ex. 13 | Ex. 10 | C. Ex. 14 | C. Ex. 15 |
|---|---|---|---|---|
| Compositions | | | | |
| PPE 0.46 | 88.20 | 0 | 0 | 0 |
| PPE-Si 0.46 | 0 | 88.20 | 0 | 0 |
| PPE 0.40 | 0 | 0 | 58.8 | 29.4 |
| PPE-Si 0.39 | 0 | 0 | 29.4 | 58.8 |
| HIPS | 7.84 | 7.84 | 7.84 | 7.84 |
| SEBS | 1.96 | 1.96 | 1.96 | 1.96 |
| Clay | 0 | 0 | 0 | 0 |
| Hydrocarbon resin | 0 | 0 | 0 | 0 |
| F88 | 0 | 0 | 0 | 0 |
| Eu-Si | 0 | 0 | 0 | 0 |
| DCP | 0 | 0 | 0 | 0 |
| SF1706 | 0 | 0 | 0 | 0 |
| Additives | 2.00 | 2.00 | 2.00 | 2.00 |
| Flammability Properties (1.5 mm thick bars) | | | | |
| Avg. FOT (sec) | 10.15 | 6.16 | 5.3 | 5.07 |
| Rating | V-1 | V-1 | V-1 | V-1 |
| Thermal and Mechanical Properties | | | | |
| HDT (° C.) | 168 | 161 | 167 | 163 |
| NII, 23° C. (J/m) | 438 | 258 | 114 | 149 |
| NII, −30° C. (J/m) | 270 | 111 | 85 | 99 |
| Tens. Mod., 23° C. (MPa) | 2476 | | | |
| Flex. Mod., 23° C. (MPa) | 2410 | | | |
| Melt Flow Rate, 300° C., 5 kg (g/10 min) | | 2.34 | 5.88 | 6.53 |

*Test parts could not be injection molded.

The invention claimed is:

1. A composition comprising:
   60 to 95 weight percent of a poly(phenylene ether)-polysiloxane block copolymer reaction product comprising
   a poly(phenylene ether) and
   a poly(phenylene ether)-polysiloxane block copolymer; and
   5 to 40 weight percent of an impact modifier; wherein the impact modifier comprises poly(alkenyl aromatic) content and rubber content, wherein the weight ratio of poly(alkenyl aromatic) content to rubber content is at least 0.5, and wherein the impact modifier comprises a rubber-modified polystyrene;
   wherein the composition comprises 1 to 10 weight percent of polysiloxane covalently bound in the poly(phenylene ether)-polysiloxane block copolymer;
   wherein the composition comprises less than or equal to 10 parts by weight of polysiloxane not covalently bound in the poly(phenylene ether)-polysiloxane block copolymer relative to 100 parts by weight of polysiloxane covalently bound in the poly(phenylene ether)-polysiloxane block copolymer;
   wherein the composition comprises 0 to 0.5 weight percent of organophosphate esters;
   wherein the composition comprises 0 to 0.5 weight percent of halogens; and
   wherein all weight percents are based on the total weight of the composition.

2. The composition of claim 1, exhibiting
   a flammability rating of V-1 or V-0 at a sample thickness less than or equal to 3.0 millimeters in the 20 millimeter Vertical Burning Flame Test of Underwriter's Laboratory Bulletin 94 "Tests for Flammability of Plastic Materials, UL 94",
   a heat deflection temperature of at least 128° C. determined according to ASTM D 648-07 using a stress of 1.82 megapascals (MPa) and a sample thickness of 3.2 millimeters, and
   a notched Izod impact strength of at least 150 joules/meter determined according to ASTM D 256-10 at 23° C. using a pendulum energy of 2.7 joules and an impact velocity of 3.5 meters per second.

3. The composition of claim 1, further comprising 4 to 15 weight percent of an inorganic filler selected from the group consisting of clays, micas, talcs, and combination thereof.

4. The composition of claim 1, wherein the impact modifier further comprises a hydrogenated block copolymer of an alkenyl aromatic monomer and a conjugated diene.

5. The composition of claim 1, wherein the composition comprises less than or equal to 0.1 weight percent of polysiloxane not covalently bound in the poly(phenylene ether)-polysiloxane block copolymer.

6. A composition comprising:
   60 to 95 weight percent of a poly(phenylene ether)-polysiloxane block copolymer reaction product comprising
      a poly(phenylene ether) and
      a poly(phenylene ether)-polysiloxane block copolymer;
   5 to 40 weight percent of an impact modifier; wherein the impact modifier comprises poly(alkenyl aromatic) content and rubber content, wherein the weight ratio of poly(alkenyl aromatic) content to rubber content is at least 0.5; and
   0.5 to 2 weight percent of a poly(ethylene oxide)-polypropylene oxide)-poly(ethylene oxide) triblock copolymer.

7. The composition of claim 1, further comprising 0.5 to 6 weight percent of a hydrocarbon resin.

8. The composition of claim 1, comprising 0 to 2 weight percent of each of homopolystyrenes, polyamides, polyolefins, polyesters, and unhydrogenated block copolymers of an alkenyl aromatic monomer and a conjugated diene.

9. The composition of claim 1, comprising 0 to 1 weight percent total of flame retardants selected from the group consisting of organophosphate esters, metal dialkylphosphinates, melamine phosphate, melamine pyrophosphate, melamine polyphosphates, and metal hydroxides.

10. The composition of claim 1,
   wherein the composition comprises 75 to 85 weight percent of the poly(phenylene ether)-polysiloxane block copolymer reaction product;
   wherein the composition comprises 3 to 6 weight percent of polysiloxane covalently bound in the poly(phenylene ether)-polysiloxane block copolymer;
   wherein the composition comprises 7 to 14 weight percent of the impact modifier;
   wherein the impact modifier comprises 6 to 10 weight percent of the rubber-modified polystyrene and further comprises 1 to 4 weight percent of a polystyrene-poly(ethylene-butylene)-polystyrene triblock copolymer;
   wherein the composition further comprises 5 to 12 weight percent of an inorganic filler comprising clay; and
   wherein the composition comprises 0 to 1 weight percent total of flame retardants selected from the group consisting of organophosphate esters, metal dialkylphosphinates, melamine phosphate, melamine pyrophosphate, melamine polyphosphates, and metal hydroxides.

11. The composition of claim 10, comprising 0 to 2 weight percent of each of homopolystyrenes, polyamides, polyolefins, polyesters, and unhydrogenated block copolymers of an alkenyl aromatic monomer and a conjugated diene.

12. An article comprising the composition of claim 1.

* * * * *